(12) United States Patent
Jagt et al.

(10) Patent No.: US 8,936,997 B2
(45) Date of Patent: Jan. 20, 2015

(54) OPTICAL COMPOSITION

(75) Inventors: Hendrik Johannes Boudewijn Jagt, Eindhoven (NL); Christian Kleynen, Eindhoven (NL); Joanna Maria Elisabeth Baken, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 445 days.

(21) Appl. No.: 13/384,609

(22) PCT Filed: Aug. 9, 2010

(86) PCT No.: PCT/IB2010/053590
§ 371 (c)(1),
(2), (4) Date: Jan. 18, 2012

(87) PCT Pub. No.: WO2011/018746
PCT Pub. Date: Feb. 17, 2011

(65) Prior Publication Data
US 2012/0126274 A1 May 24, 2012

(30) Foreign Application Priority Data
Aug. 12, 2009 (EP) .................................. 09167696

(51) Int. Cl.
*H01L 21/46* (2006.01)
*C09K 11/02* (2006.01)
(Continued)

(52) U.S. Cl.
CPC ............. *C08K 3/0008* (2013.01); *C09K 11/02* (2013.01); *C08K 2201/011* (2013.01); *C08K 3/22* (2013.01)
USPC ........................................... 438/455; 257/98

(58) Field of Classification Search
CPC .................................................. H01L 21/76254
USPC ...................................... 438/22, 455; 257/98
See application file for complete search history.

(56) References Cited

U.S. PATENT DOCUMENTS

2005/0269582 A1  12/2005  Mueller et al.
2007/0041191 A1  2/2007  Okada
(Continued)

FOREIGN PATENT DOCUMENTS

CN       1674315 A       9/2005
JP       2008536328 A    9/2008
WO       2006109261 A1   10/2006
(Continued)

OTHER PUBLICATIONS

"Refractive Indices of Rutile as a Function of Temperature and Wavelength" J. Rams, J. App. Phys. vol. 82, No. 3, Aug. 1, 1997, p. 994-997.
(Continued)

*Primary Examiner* — Jack Chen (57) ABSTRACT

The invention relates to a composition comprising a binder material and nanoparticles having an average particle size of 100 nm or less having a first refractive index of at least 1.65 in respect of light of a first wavelength, and a second refractive index in the range of 1.60-2.2 in respect of light of a second wavelength, wherein said first refractive index is higher than said second refractive index, and wherein the first and second refractive indices may be tuned by adjusting the volume ratio of the nanoparticles to the binder material. The composition may improve light extraction when used for bonding a ceramic member to an LED, and/or may reduce the amount of light that is directed back towards the LED.

15 Claims, 5 Drawing Sheets

(51) Int. Cl.
  *C08K 3/00*  (2006.01)
  *C08K 3/22*  (2006.01)

(56) References Cited

U.S. PATENT DOCUMENTS

2008/0210965 A1    9/2008  Hung
2012/0126274 A1*   5/2012  Jagt et al. .................... 257/98

FOREIGN PATENT DOCUMENTS

WO    2007138502 A2    12/2007
WO    2008063884 A1     5/2008

OTHER PUBLICATIONS

"Synthesis and Properties of Titanium Dioxide/Polydimethylsiloxane Hybrid Particles" M. Nakade, Journal of Materials Science, vol. 39, 2003, p. 4131-4137.

* cited by examiner

OPTICAL COMPOSITION

FIELD OF THE INVENTION

The present invention relates to the field of LED based illumination devices, in particular devices in which an optical member is attached to the LED via an optical bond.

BACKGROUND OF THE INVENTION

Light-emitting diode (LED) based illumination devices are increasingly used for a wide variety of lighting and signaling applications. LEDs offer advantages over traditional light sources, such as incandescent and fluorescent lamps, including long lifetime, high lumen efficacy, low operating voltage and fast modulation of lumen output.

Efficient high-power LEDs are often based on blue light emitting InGaN materials. To produce an LED based illumination device having a desired color (e.g., white) output, a suitable wavelength converting material, commonly known as a phosphor, may be used which converts part of the light emitted by the LED into light of longer wavelengths so as to produce a combination of light having desired spectral characteristics. The phosphor may for example be embedded in an organic encapsulant material, such as epoxy, applied on top of the LED, or it may be pre-formed into a ceramic self-supporting layer which may be applied on the LED. Advantageously, a ceramic phosphor layer is more robust and less temperature sensitive than conventional organic phosphor layers. Such a ceramic phosphor layer is attached to the LED by means of an optical bond. Typically, materials used for such bonds include optical silicones, which have high photothermal stability, required by the operating conditions of the LED, and high transparency.

However, the commonly used optical bonds have a relatively low refractive index, typically in the range of 1.4 to 1.58, compared to the refractive index of the top layer of the LED through which light is extracted (which may be a top contact, e.g. GaN (refractive index of about 2.42), or a sapphire (refractive index of about 1.77) growth substrate). As a result, the critical angle for total internal reflection of light incident on the bond from the LED is relatively small. Light incident on the bond at angles exceeding the critical angle is not directly extracted from the LED. Also, the low refractive index of the bond compared to the refractive index of the ceramic phosphor results in limited transmission due to reflections at the interface. Thus, conventional optical bonds result in limited light extraction and transmission.

WO2007/138502 discloses an inorganic phosphor body for an LED comprising an inorganic luminescent material. A bonding precursor material is arranged an a surface of the inorganic phosphor body and the bonding precursor material comprises an at least partly hydrolyzed organically modified silane. The bonding precursor may further comprise oxide, which serves to increase the bonds index of refraction, which in turn enhances the light coupling capability of the bond. The refractive index may also be tailored within limited amounts by choosing an appropriate ratio between methyl and phenyl-modified silanes in the reaction mixture.

However, in spite of the bonding precursor presented in WO2007/138502, there remains a need in the art for improved optical bonds.

SUMMARY OF THE INVENTION

It is an object of the present invention to at least partly overcome the above problem, and to provide an optical bond which may provide improved light extraction and/or light transmission from an LED-based illumination device.

In a first aspect, the invention relates to a composition comprising a binder material and nanoparticles having an average particle size of 100 nm or less, preferably 50 nm or less, the composition having a first refractive index ($n_1$) of at least 1.65, preferably at least 1.75 in respect of light of a first wavelength, and a second refractive index ($n_2$) in the range of 1.60-2.2 in respect of light of a second wavelength, wherein the first refractive index ($n_1$) is higher than said second refractive index ($n_2$), and wherein the first and second refractive indices may be tuned by adjusting the volume ratio of the nanoparticles to the binder material. The difference between refractive indices $n_1$ and $n_2$ provides differentiated critical angles of total internal reflection for light of different wavelengths at interfaces with a material onto which the composition is applied. The critical angles may be tuned for any specific application by adapting the first and second refractive indices of the composition.

In particular, the first refractive index ($n_1$) may be at least 1.80, for example at least 1.85, and the second refractive index ($n_2$) may be in the range of 1.70 to 1.90. Furthermore, the difference between said first refractive index ($n_1$) and said second refractive index ($n_2$) may be at least 0.03, and preferably at least 0.04, when the first wavelength is about 450 nm or less and the second wavelength is about 570 nm or more. High dispersion (i.e. wavelength-dependent refractive index) is advantageous since, for example, when used as an optical bond in an LED-phosphor illumination device, good light extraction of LED light may be obtained while reducing the amount of converted light that is transmitted back towards the LED die. Thus, using a composition according to embodiments of the invention, the efficiency of an LED-phosphor illumination device may be improved.

In embodiments of the invention, the first wavelength may be in the range of from 350 to 500 nm, typically from 420 to 470 nm, which is suitable for a LED based illumination device with a wavelength converting member such as YAG:Ce phosphor. The second wavelength may be in the range of from 550 to 800 nm.

The composition may preferably have adhesive properties.

The nanoparticles of the composition may be selected from the group consisting of $TiO_2$, $ZrO_2$, $Y_2O_3$, $Y_2O_3$-stabilized $ZrO_2$, $HfO_2$, $Ta_2O_5$, $Nb_2O_5$, $TeO_2$, $BaTiO_3$ and SiC. Typically, the nanoparticles comprise $TiO_2$. $TiO_2$ has an absorption band in the near UV wavelength range, thus providing high dispersion at desirable wavelengths without too much absorption. Moreover, $TiO_2$ is cheap and readily available from commercial suppliers.

The volume content of nano-particles is in the range of from 15 to 75% and more preferably 30 to 60% based on the volume of the composition. Furthermore, the nanoparticle:binder volume ratio is from 15:85 to 99:1.

The binder component of the composition according to embodiments of the invention may comprise silicates, alkylsilicate and/or alkylpolysiloxane. In another aspect, the invention relates to an illumination device comprising a semiconductor layered structure adapted to emit light of
    a first wavelength and comprising a transparent layer having a refractive index $n_{a1}$ in respect of a first wavelength;
  a ceramic member arranged adjacent said transparent layer to receive light of said first wavelength emitted by the semiconductor layered structure via said transparent layer, the ceramic member having a refractive index $n_{b1}$ in respect of said first wavelength; and a bonding region provided between said transparent layer and said ceramic member and in direct contact with said transparent layer and said ceramic member, the bonding region comprising a composition as defined above, wherein the first refractive index ($n_1$) of said composition matches (e.g. is within from +0.01 to −0.10) the lower one of the refractive indices $n_{a1}$ and $n_{b1}$.

The ceramic member may be a wavelength converting member adapted to convert light of said first wavelength to light of a second wavelength and having a refractive index $n_{b2}$ in respect of said second wavelength, and said second refractive index ($n_2$) of said composition may then be lower than said refractive index $n_{b2}$ of said wavelength converting member.

When the transparent layer is a sapphire substrate and the refractive index $n_1$ matches the refractive index $n_{a1}$ of the sapphire substrate in respect of light of a wavelength emitted by the LED, light extraction from the sapphire substrate to the bond is improved. Also, when the refractive index $n_2$ is lower than $n_{b2}$, the light emitted by the wavelength converting member experiences a smaller critical angle of total internal reflection at the wavelength converter-to-bond interface, resulting in less converted light being transmitted back to the LED where it risks being absorbed.

When the transparent layer is a GaN layer and the refractive index $n_1$ of the bond matches the refractive index $n_{b1}$ in respect of the light emitted by the LED, the transmittance of light from the bond to the ceramic member is nearly without loss. Furthermore, as mentioned above, the light emitted by a wavelength converting member may experience a smaller critical angle of total internal reflection at the wavelength converter-to-bond interface, resulting in less converted light being transmitted back to the LED where it risks being absorbed.

In a further aspect, the invention relates to an illumination device comprising:
a semiconductor layered structure, such as an LED, adapted to emit light of a first wavelength range and comprising a transparent layer having a refractive index $n_{a1}$ in respect of a first wavelength; and
a wavelength converting member arranged to receive light of said first wavelength range emitted by the semiconductor layered structure via said transparent layer, the wavelength converting member comprising: (i) a wavelength converting material adapted to convert light of said first wavelength to light of a second wavelength range and having a refractive index $n_{b1}$ in respect of said first wavelength and a refractive index $n_{b2}$ in respect of said second wavelength, and (ii) a composition as defined in claim 1 as a binder for the wavelength converting material, wherein the second refractive index ($n_2$) of the composition matches (e.g. is within from +0.1 to −0.01) said refractive index $n_{b2}$ and the first refractive index $n_1$ is higher than said refractive index $n_{b1}$.

Due to the dispersion of the composition, scattering of light emitted by the semiconductor layer structure is increased, which may improve the efficiency of the device, since more light becomes available for conversion by the wavelength converting material. Also, mixing of unconverted and converted light is improved. Furthermore, back emission of converted light towards the die may be reduced.

The first wavelength emitted by the semiconductor layer structure may be in the range of from 350 to 500 nm, for example about 450 nm, and said second wavelength emitted by the wavelength converting material may be in the range of from 550 to 800 nm.

In another aspect, the invention relates to a method for bonding a first body to a second body via a high refractive index optical bond, comprising:
dispensing a composition as defined above or a precursor thereof on said first or second body;
contacting said first and second bodies via said composition or precursor; and
subjecting said composition or precursor to curing conditions and allowing the composition or precursor to cure.

It is noted that the invention relates to all possible combinations of features recited in the claims.

BRIEF DESCRIPTION OF THE DRAWINGS

These and other aspects of the present invention will now be described in more detail, with reference to the appended drawings showing embodiment(s) of the invention.

DETAILED DESCRIPTION

In one aspect, the invention relates to a composition which may be used as a binder or a bond in or for optical components and which has high refractive index and high dispersion. The composition comprises a binder material having nanoparticles dispersed therein. The refractive index of the composition may be in the range of 1.65 to 2.2 and may be tuned within this range by adapting the volume ratio of the oxide nanoparticles to the binder material. When used as an optical bond in an LED-based illumination device, the composition may improve light extraction and transmission due to tuning of the critical angle of total internal reflection at interfaces with ceramic components.

As used herein, the term "match" in respect of the first wavelength (typically in the range of 350 to 500 nm) is intended to include a deviation of from −0.10 to +0.01. Thus, the expression "a refractive index of a first body matches a refractive index of another body in respect of the first wavelength" means that the refractive index of the first body is within −0.10 to +0.01 of the refractive index of the other body in respect of the same wavelength.

Furthermore, the term "match" in respect of the second wavelength (typically 550-800 nm) is intended to include a deviation from −0.01 to +0.10.

Consequently, the term "mismatch" refers to differences in refractive index outside the above match ranges.

Figure 1A:
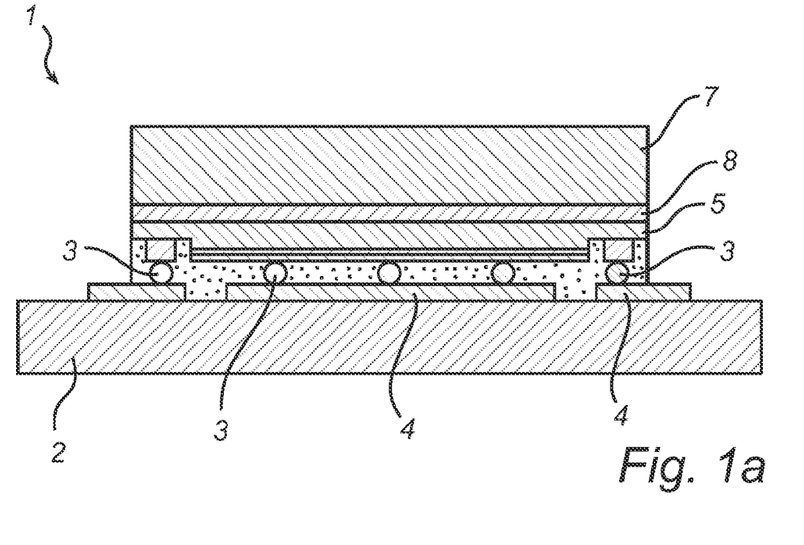
FIG. 1a-b illustrates schematically illumination devices according to embodiments of the invention.

FIG. 1a illustrates an illumination device 1 comprising a flip chip type LED 5 arranged on a submount 2 and electrically connected via electric contacts 3 to contact pads 4 disposed on the submount. The growth substrate has been removed, e.g. by laser release, such that light is extracted through the top electrode, typically GaN (not shown). The top electrode may be roughened in order to improve light extraction. A ceramic wavelength converting body 7 is arranged over the top electrode and bonded thereto by an optical bond 8 formed by the composition described herein.

The composition forming the bond 8 may have a refractive index of at least 1.65, preferably in the range of 1.7 to 2.2. Also, the composition has high dispersion, i.e. differences in wavelength-dependent refractive index. The dispersion is typically of the normal type, meaning the refractive index is higher for shorter wavelengths than for longer wavelengths.

Typically, the refractive index of the composition may match the refractive index of the ceramic phosphor in respect of a wavelength in the range of 350-500 nm, which for the phosphor is usually 1.85-2.15, depending on the type of phosphor (e.g. 1.85-1.87 for YAG:Ce). Hence, a first refractive index $n_1$ of the composition may be at least 1.75, preferably at least 1.80 and more preferably at least 1.85 in respect of a wavelength in the range of 350-500 nm. The refractive index $n_1$ may also be higher than that of the phosphor so as to better match the refractive index of the top layer of the LED stack (GaN typically has a refractive index of about 2.42); however, a composition having such a high index may be more difficult to produce and therefore matching of the refractive index of the phosphor may be preferred. The high refractive index of the composition reduces the difference in refractive index between the LED top layer and the composition compared to a conventional optical bond, and thus the critical angle of total internal reflection is increased, compared to conventional optical bonds, for light in the range of 350-500 nm travelling through the LED top layer incident on the composition. Hence, more light is extracted from the LED at first pass. Since the index $n_1$ of the composition is at least close to the refractive index of the phosphor in respect of the same wavelengths, virtually no light is lost by total internal reflection at the subsequent bond-to-phosphor interface.

Furthermore, a second refractive index $n_2$ of the composition in respect of a second, longer wavelength, e.g. in the range of 550-800 nm, is smaller than the first refractive index $n_1$. Typically, the refractive index $n_2$ may be 1.60-1.95, preferably 1.70-1.90.

The second refractive index $n_2$ of the composition in respect of a second, longer wavelength may preferably mismatch a second refractive index of the ceramic phosphor in respect of the same wavelength, the second refractive index $n_2$ of the composition being lower than said second refractive index of the ceramic phosphor. Thus, part of the light of said second, longer wavelength emitted by the phosphor back towards the phosphor-to-bond interface will experience a critical angle of total internal reflection which prevents light of said second wavelength from being transmitted back to the LED, resulting in reduced light loss due to absorption in the LED die.

Furthermore, as a result of the high dispersion, light of said second, longer wavelength incident from the composition on an interface with an adjacent high index material (e.g., LED top electrode) experiences a smaller critical angle than light of shorter wavelengths. Hence, less light of said longer wavelengths is transmitted back towards the LED, compared to light of shorter wavelengths.

Thus, a benefit of the high dispersion is that the critical angle of total internal reflection for the second wavelength is higher than the critical angle for light of the first, shorter wavelength. However, in order to realize this benefit, the difference in refractive index between the composition and the phosphor must be considered with respect to the dispersion of the composition as well as the dispersion of the phosphor, in order to achieve a mismatch for the second wavelength. For the purpose of the bond embodiments of the present invention, the refractive index of the composition in respect of a first wavelength may be up to +0.01, and as low as −0.1, of the that of the ceramic which it is intended to match.

However, in embodiments of the invention, it is not necessary that the first refractive index $n_1$ of the composition strictly matches the refractive index of the phosphor for shorter wavelengths, as long as the index mismatch for longer wavelengths between the composition and the phosphor is even larger. For example, the first refractive index $n_1$ of the composition may be more than 0.10 lower than the index of the phosphor in respect of the same wavelength, since the second refractive index $n_2$ of the composition then is even lower.

Figure 1B:
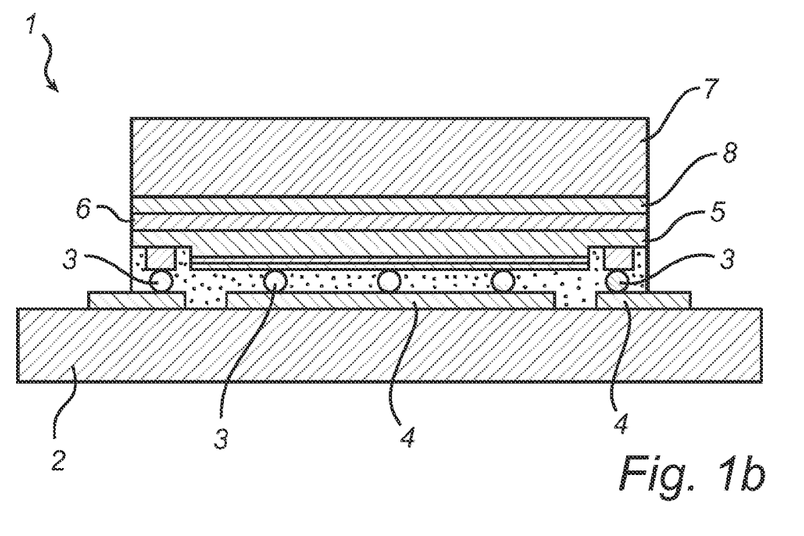

FIG. 1b illustrates an illumination device 1 comprising a flip chip type LED 5 arranged on a submount 2 and electrically connected via electric contacts 3 to contact pads 4 disposed on the submount 2. On the side opposite the contact pads, the semiconductor layers are covered by a growth substrate 6 through which light is extracted. A ceramic wavelength converting body 7 is arranged over the substrate and bonded thereto by an optical bond 8 formed by the composition described herein.

In embodiments in which the substrate 6 has a refractive index higher than that of the ceramic phosphor 7, such as in the case of a SiC substrate (refractive index of about 2.69), the first and second refractive indices $n_1$ and $n_2$, respectively, may be as described above.

In embodiments where the substrate 6 has a refractive index which is lower than that of the ceramic phosphor 7, the first refractive index $n_1$ of the composition of the bond 8 may match the refractive index of the substrate or that of the ceramic phosphor, for light of a wavelength in the range of 350-500 nm. The refractive index of a sapphire substrate in respect of said wavelengths is usually 1.75-1.80, which typically is lower than a refractive index of the ceramic phosphor. The refractive index of the phosphor may be as indicated above. Hence, a first refractive index $n_1$ of the composition may be at least 1.65, preferably at least 1.75, more preferably 1.80 and even more preferably at least 1.85 in respect of a wavelength in the range of 350-500 nm.

In embodiments of the invention in which the substrate 6 has a refractive index which is lower than that of the ceramic phosphor 7, the first refractive index $n_1$ of the composition may be adapted to match the refractive index of the substrate in respect of the same wavelengths. Compared to conventional optical bonds having a refractive index which is lower than that of the LED substrate, the critical angle of total internal reflection for light incident on the bond from the LED substrate is increased, and by closely matching the refractive index of the composition with that of the substrate, light extraction with virtually no loss may be obtained from the LED to the composition.

In other embodiments of the invention, the first refractive index $n_1$ may be in the range between the refractive indices of the LED substrate and the ceramic phosphor in respect of the same wavelengths, or the first refractive index may match the refractive index of the ceramic phosphor. Hence, light extraction from the bond to the phosphor may be improved instead.

In general, index matching of the composition with the adjacent material having the lowest refractive index in respect of the same wavelengths may be preferred since a higher amount of binder may then be used in the composition, providing improved adhesive properties. Thus, should the refractive index of the ceramic phosphor be lower than that of the substrate in respect of the same wavelength, the first refractive index $n_1$ of the present composition may be adapted to match the index of the ceramic phosphor in respect of that wavelength as described above.

As described above, a refractive index $n_2$ of the composition in respect of a longer wavelength, e.g. in the range of 550-800 nm, is smaller than the refractive index $n_1$. Typically, the refractive index $n_2$ may be 1.60-1.95, preferably 1.70-1.90. Furthermore, the second refractive index $n_2$ of the composition in respect of a second, longer wavelength may preferably mismatch a second refractive index of the ceramic phosphor in respect of the same wavelength, the second refractive index $n_2$ being lower than said second refractive index of the ceramic phosphor.

If the first refractive index $n_1$ matches the refractive index of the phosphor in respect of light of a first wavelength, light of the first, shorter wavelength is transmitted virtually without loss from the bond to the phosphor and vice versa. However, the mismatch in refractive index in respect of a second, longer wavelength, which is due to the high dispersion, will lead to reflectance of part of the light of said second, longer wavelength emitted by the phosphor back towards the phosphor-to-bond interface, thus resulting in reduced light loss caused by absorption in the LED die.

If refractive index $n_1$ matches the refractive index of the substrate and is lower than the refractive index of the phosphor in respect of the same wavelengths, then the second refractive index $n_2$ of the composition is even lower. As a result, light of both the first and second wavelengths, respectively, directed back from the phosphor towards the composition will experience an angle of total internal reflection at the phosphor-to-bond interface and will, in part, be reflected. However, due to the high dispersion of the composition, light of longer wavelengths will experience a smaller angle of total internal reflection compared to light of shorter wavelengths and thus less light of longer wavelengths will be transmitted back to the LED.

In cases where the first refractive index of the composition matches the refractive index of the substrate, the mismatch in refractive index between the composition and the phosphor in respect of longer wavelengths is larger compared to cases where the first refractive index $n_1$ of the composition matches the refractive index of the phosphor. Thus, more light of the second wavelength is prevented from being transmitted back to the LED die when the first refractive index $n_1$ of the composition matches the refractive index of the substrate rather than that of the phosphor.

Figure 2:
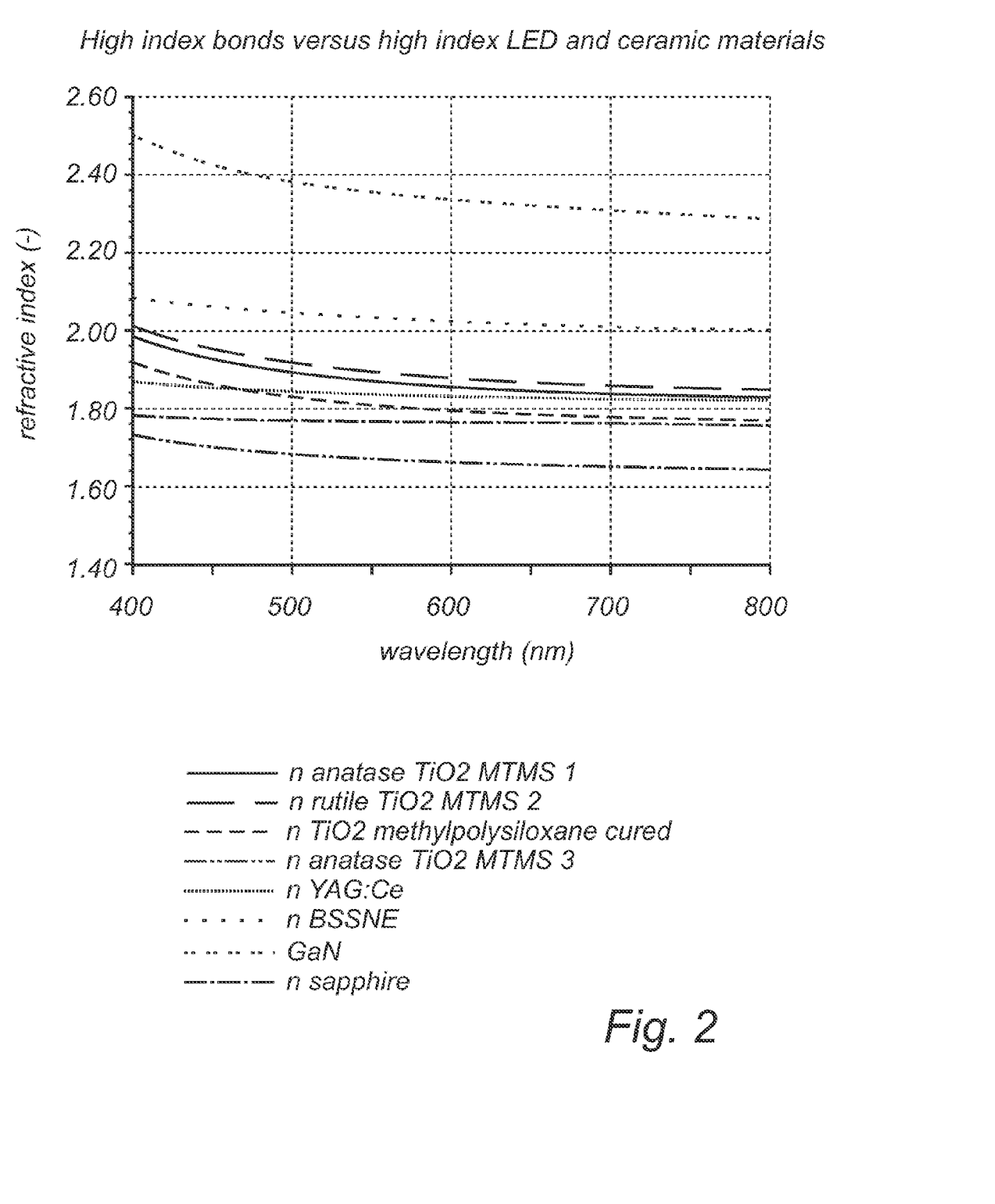
FIG. 2 is a graph presenting wavelength-dependent refractive index for compositions according to embodiments of the invention and other materials.

FIG. 2 shows examples of the refractive index as a function of wavelength obtained experimentally for various compositions according to embodiments of the invention and also for sapphire, GaN and two typical phosphor materials (YAG:Ce, BSSNE). As can be seen in this figure, compositions according to the invention (anatase $TiO_2$ MTMS 1, rutile $TiO_2$ MTMS 2, $TiO_2$ methylpolysiloxane cured, anatase $TiO_2$ MTMS 3) exhibit considerable dispersion in the wavelength range of 400 to 800 nm. Also, the dispersion of the composition according to the invention is greater than the dispersion of the sapphire as well as the phosphor materials.

As can also be seen in FIG. 2, the refractive index of $TiO_2$ methylpolysiloxane (cured) is higher than the refractive index of a YAG:Ce phosphor for wavelengths in the lowest part of this spectrum (<about 470 nm), whereas the refractive index of the same $TiO_2$ methylpolysiloxane is lower than the refractive index of the YAG:Ce phosphor for wavelengths in the higher part of this spectrum (>about 470 nm). In general it is desirable that the index mismatch is larger for longer wavelengths (>550 nm) than for shorter wavelengths (<500 nm).

The data presented in FIG. 2 shows that for a composition according to embodiments of the invention, a difference in refractive index between a first wavelength of 450 nm emitted by an LED and a second (conversion) wavelength of 570 nm emitted by the phosphor may be about 0.044-0.065 for a corresponding refractive index of 1.81 to 1.95.

Generally a higher refractive index by varying the composition of similar material combinations is associated with a higher dispersion. For comparison, the differences in refractive index in respect of the same wavelengths is about 0.0153-0.0178 for a YAG:Ce phosphor, and 0.0320 for a europium doped barium strontium silicium nitride (BSSNE) phosphor. The refractive index and dispersion of the phosphor may vary slightly with the exact composition of the phosphor, such as the amount of dopant, the precise stoichiometry, and the addition of additional elements, such as of gadolinium (Gd) to a YAG phosphor.

The dispersion of a conventional low refractive index bonding material, such as a methylpolysiloxane is much lower than the dispersion of the composition according to embodiments of the invention, e.g. about 0.010 at a refractive index of 1.43 for 450 nm.

In embodiments of the invention, the composition comprises a binder material and nanoparticles as a filler. The nanoparticles have an average particle size of 100 nm or less and thus are transparent to visible light. The nanoparticles serve to increase the refractive index of the composition.

For bonding applications, the binder material of the composition may preferably be a high refractive index material, and have good photothermal stability. Typically, Si based polymeric material may be used, in particular alkylsilicates, such as methylsilicate, propylsilicate, butylsilicate, phenylsilicate and mixtures thereof, and alkylpolysiloxanes, such as methylpolysiloxane, propylpolysiloxane, butylpolysiloxane and mixtures thereof.

Compositions comprising alkylsilicates may be prepared from alkylalkoxysilanes using solgel processes. Suitable alkylalkoxysilanes include mono-organically modified silanes, such as methyltrimethoxysilane, methyltriethoxysilane and phenyltrimethoxysilane, phenyltriethoxysilane, and di-organically modified silanes, such as dimethyldimethoxysilane, having 2 alkyl groups and 2 alkoxy groups per Si monomer. Also, dimers, trimers and oligomers of these silane monomers may be used. Furthermore, non-organically modified silanes, such as tetramethoxysilane or tetraethoxysilane, may be also used, to form a silicate binder upon condensation curing. Also mixtures of the above mentioned silane monomers may be used. Also oligomers or partially polymerized silane materials may be used. For instance, a partially polymerized methylsilicate or phenylsilicate may be used that can be reacted further. These oligomeric or partially polymerized materials may be a solid but may still be dissolvable in suitable solvents and as such be used.

Silicones, comprising polymerized —($R_2SiO$) chains, R usually being a methyl or phenyl side group on a —(Si—O)— backbone, may also be used for preparing the binder component of the composition according to embodiments of the invention.

The nanoparticles may be dispersed in a solvent to which the binder material or a precursor thereof (e.g. a silane as described above) may be added. Alternatively, the nanoparticles may be dispersed directly in the binder material or a precursor thereof.

For some applications, e.g. when used as a coating or a binder in a remote phosphor application, the binder material of the composition need not have as high photothermal stability as required for use in bonding a ceramic phosphor directly onto a LED die. Thus, for such applications, a wide variety of binder materials may be used, including inter alia epoxies, acrylics, polyacetates, polyamides, polyacrylamides, cyclic olefins, polyolefines, polyethers, polyethyleneoxides, polyvinylalcohols, polyethyleneimines, polyvinylpyrrolidones and polyimides.

The refractive index of the binder material alone may be in the range of 1.4-1.6, but binders having even lower, or higher, refractive index may also be used.

The nanoparticles have an average particle diameter of 100 nm or less, preferably 50 nm or less. Preferably, at least 90% or the nanoparticles may have a diaterer in the range of 5-40 nm.

The nanoparticles may be selected from the group consisting of $TiO_2$, $ZrO_2$, $Y_2O_3$, $Y_2O_3$, stabilized $ZrO_2$, $HfO_2$, $Ta_2O_5$, $Nb_2O_5$, $TeO_2$, $BaTiO_3$ and SiC nanoparticles. Preferably, $TiO_2$ nanoparticles may be used, either of rutile or anatase or brookite crystal structure or mixtures thereof. $TiO_2$ particles may be surface treated with $SiO_2$ and/or $Al_2O_3$ to reduce their photocatalytic activity. As an additive, $SiO_2$ and/or $Al_2O_3$ may also be included in the composition for the purpose of reducing shrinkage stress. Moreover, advantageously $Al_2O_3$ and/or $TiO_2$ may be used to improve the thermal conductivity of the composition. As another additive a suitable dispersing agent may be used for increasing the compatibility of a proper dispersion of the nano-particle in the composition or a precursor thereof. Such a dispersing agent typically combines nano-particles affinic chemical groups (e.g. polar) with binder affinic groups (e.g. apolar). The dispersing agent may be an organic molecule, e.g. a block copolymer, or an acid.

By adjusting the volume ratio of the nanoparticles in the composition, in particular the nanoparticle:binder volume ratio, a desirable refractive index and dispersion can be obtained. The minimum amount of nanoparticles in the composition may be about 15% by total volume of the composition. Typically, the nanoparticles may constitute at least 20%, for example at least 30% by total volume of the composition. The maximum amount of nanoparticles may be about 70% by total volume, the remaining portion being binder material and optionally air (pores). The nanoparticle:binder volume ratio, or alternatively the nanoparticle:(binder+additive) ratio, may be from 15:85 to 99:1. For example, the composition may comprise up to 70% by volume of nanoparticles, up to 10% by volume of binder material and 20% by volume of air. It is preferred to include at least about 5% by volume of binder in order to have acceptable adhesive or tack properties. The amount of binder may be very small, just covering the surface of the nanoparticles.

Figure 7:
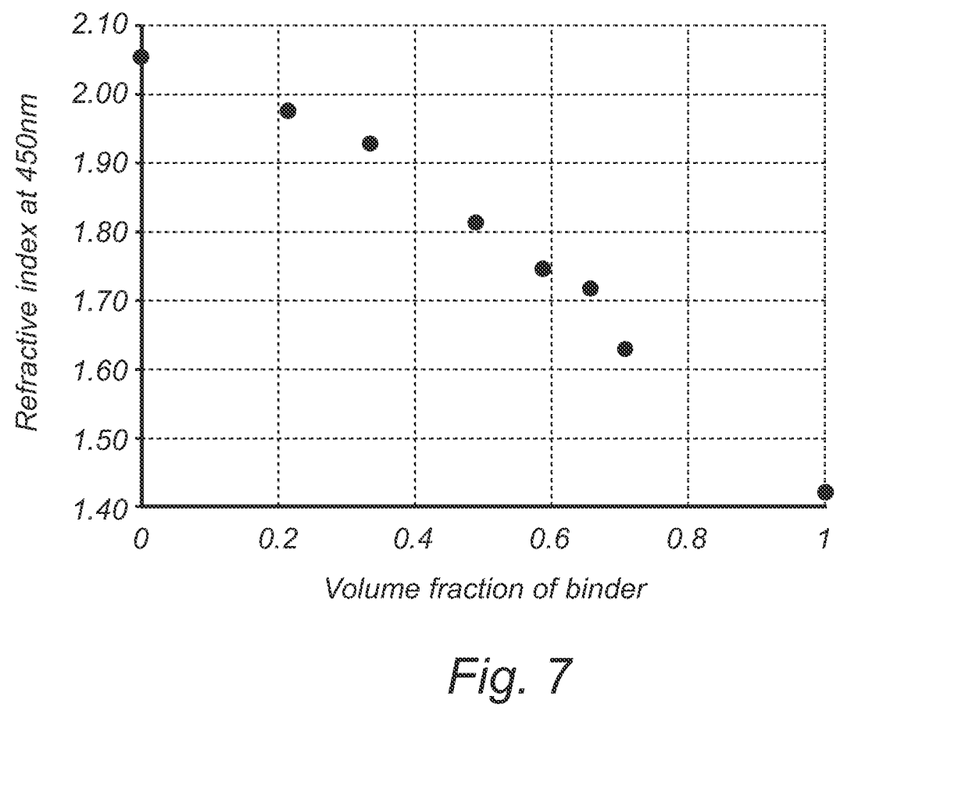
FIG. 7 is a graph presenting values of refractive index for various volume fractions of binder in the composition.

FIG. 7 is a graph presenting experimental values of the refractive index of a composition according to embodiments of the invention at 450 nm as a function of the volume fraction of the binder of the composition. The composition comprises a methylsilicate/nano-$TiO_2$ composition prepared from methyltrimethoxysilane monomer mixed with $TiO_2$ nano-particles in aqueous dispersion, dried and coated. As can be seen in this figure, the refractive index of the composition may be adapted by suitably adjusting the volume fraction of the binder. The refractive index value may also be slightly influenced by the curing temperature of the composition. It is also possible to adapt the refractive index of the composition by using a binder material having a different refractive index.

In embodiments of the invention, the composition may be used as a binder for a particulate wavelength converting material, typically an inorganic phosphor material. In such embodiments, the second refractive index $n_2$ may match a refractive index of the phosphor material in respect of light of the phosphor converted wavelengths, typically in the range of 550-800 nm, whereas the first refractive index $n_1$ of the composition may mismatch the refractive index of the phosphor material in respect of light of a shorter, non-converted wavelength. The resulting phosphor-binder mixture may be applied onto the LED to adhere thereto, which aids to extract more light from the LED by increasing the critical angle for light extraction from the LED.

The phosphor-binder mixture may also be combined with another phosphor-binder mixture or a ceramic phosphor, either on the side facing towards the LED or facing away from the LED, improving the light transmission between the phosphor layers and/or between the LED and the phosphor stack and/or between a high refractive index encapsulant and the phosphor stack. An additional bond using the composition may be used to attach the phosphor layer stack to the LED and/or the high refractive index encapsulant. The phosphor layer stack may, for example, comprise a phosphor with a yellowish emission and a phosphor with a reddish emission in order to provide a warm white emission.

Alternatively or additionally, a phosphor-binder mixture may be applied onto another structure of an illumination device in a so-called remote phosphor configuration, in which the LED and the phosphor are mutually spaced apart (such as by an air gap).

As a result of the match in refractive indices for converted light between the wavelength converting material and the composition according to embodiments of the invention, the reflection coefficient of the particulate phosphor material is reduced, thus increasing light extraction from the wavelength converting member. An example of a composition that is close to matching for converted light with a phosphor is shown in FIG. 2 by comparing the refractive index curves of anatase $TiO_2$ MTMS 1 and YAG:Ce. A slight reduction of $TiO_2$ content will further optimize this matching. Furthermore, since the high dispersion of the composition according to embodiments of the invention provides a mismatch in refractive index of non-converted light (e.g. blue LED light of 450 nm, the mismatch is evident by comparing the refractive index curves of anatase TiO2 MTMS 1 and YAG:Ce phosphor), scattering of non-converted light is less reduced, thus still providing color mixing capability of converted and non-converted light.

Figure 3:
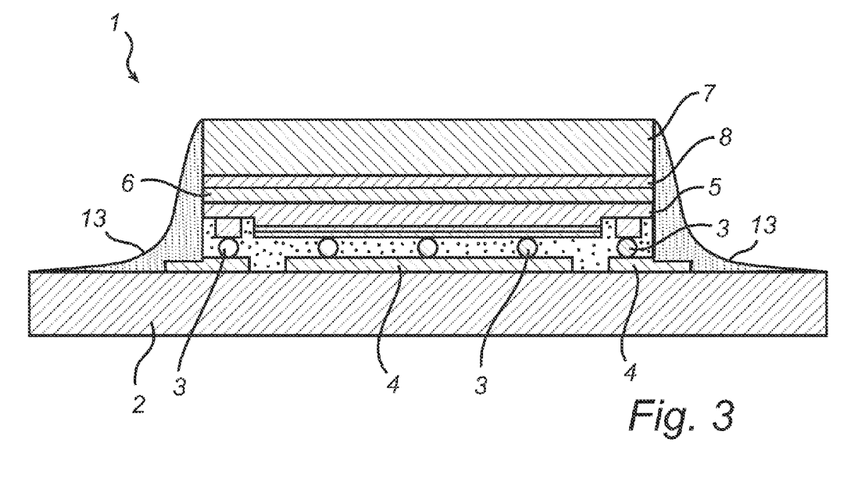
FIG. 3 illustrates schematically an illumination device according to embodiments of the invention.
Figure 4:
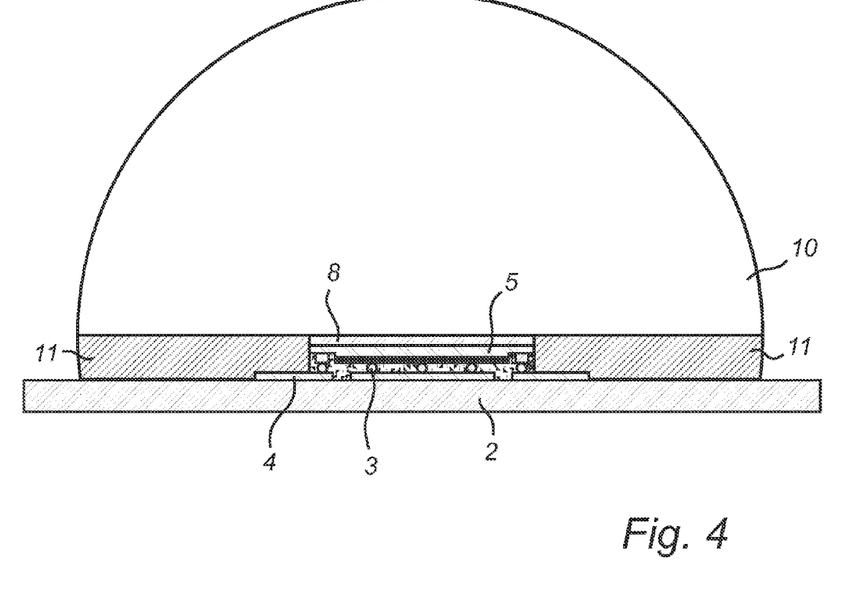
FIG. 4 illustrates schematically an illumination device according to embodiments of the invention.
Figure 5:
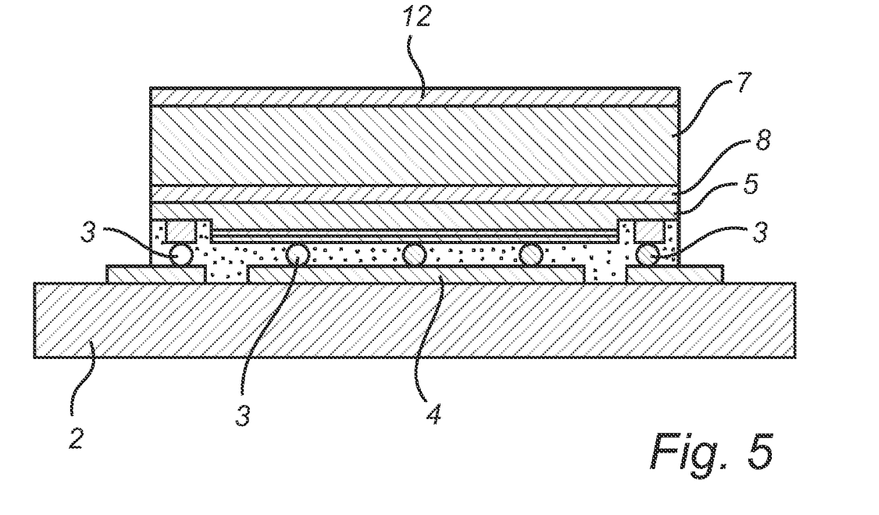
FIG. 5 illustrates schematically an illumination device according to embodiments of the invention.

Thus, in these embodiments, a benefit of the high dispersion is that light of the first wavelength is scattered to a higher extent than light of the second, longer wavelength. However, in order to realize this benefit, the difference in refractive index between the composition and the phosphor must be considered with respect to the dispersion of the composition as well as the dispersion of the phosphor particles, in order to achieve a mismatch for the first wavelength. For the purpose of these embodiments, the refractive index of the composition in respect of a second wavelength may be up to +0.1, and only as low as −0.01, of the that of phosphor particles which it is intended to match. FIGS. 3-5 illustrate illumination devices according to various embodiments of the invention.

FIG. 3 shows an illumination device 1 comprising a flip-chip type LED 5 and a ceramic phosphor tile 7 typically 1×1 mm and having a thickness about 100-150 μm. The illumination device 1 may have the same features as the device of FIG. 1a or FIG. 1b, including a bond 8 comprising the composition according to embodiments of the present invention. Furthermore, the device of FIG. 3 comprises at least one reflector domain 13 comprising a reflective material disposed adjacent a lateral side of the LED 1.

FIG. 4 shows an illumination device 1 comprising a flip chip LED 5 to which an optical member 10 in the form of a dome is attached by a bond 8 comprising a composition according to embodiments of the invention. The optical member 10 has the shape of a half-sphere. The optical member 10 may comprise a ceramic material, such as YAG or sapphire, or a high index glass. Optionally, the optical member 10 may contain scattering elements, such as pores. The refractive index of the composition forming the high index bond 8 may match the refractive index of the optical member 10 in respect of a first wavelength, or the refractive index of the composition may be slightly higher than the refractive index of the optical member. The high index bond 8 may be disposed between the optical member and the LED only, and a conventional filler or bonding material 11, such as a conventional silicone bond, may fill any remaining space between the optical member 10 and the submount 2. Said conventional filler or bonding material may be transparent or may comprise scattering elements. Alternatively, the high refractive index bond 8 comprising the composition according to embodiments of the invention may be applied on the entire area of the optical member 10 facing the LED 5 and the submount 2.

FIG. 5 shows a side-emitting illumination device 1 comprising a flip-chip type LED 5 onto which a ceramic body 7 is attached by a bond 8 comprising a composition according to embodiments of the invention. The ceramic body 7 may be substantially transparent. The ceramic body 7 may be undoped and may comprise polycrystalline alumina ($Al_2O_3$), sapphire or YAG, or a high index glass. Alternatively, the ceramic body 7 may comprise a dopant, thus forming a ceramic phosphor, such as YAG:Ce. Furthermore, the illumination device 1 comprises a top reflector 12 reflecting light emitted by the LED 5 and optionally converted by a ceramic phosphor body 7 so that light may exit the device via the lateral sides of the LED and/or the ceramic body.

Figure 6:
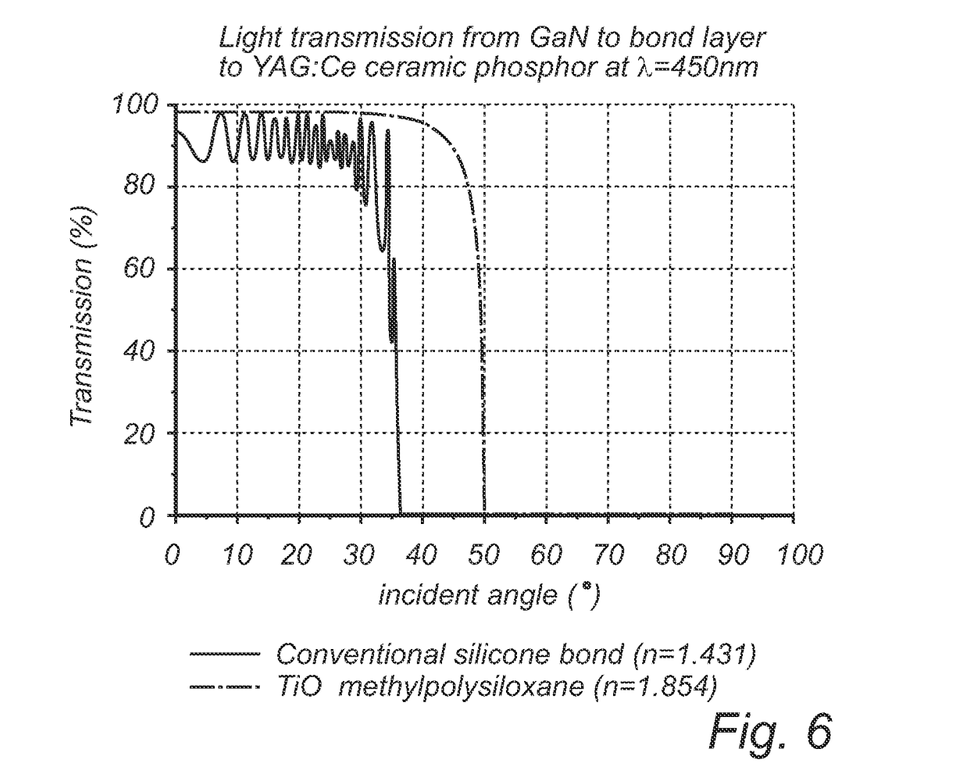
FIG. 6 is a graph illustrating the light transmission from GaN to bond to phosphor layer as a function of the incident angle for a bond comprising a composition according to embodiments of the invention and a conventional silicone bond, respectively.

FIG. 6 demonstrates the advantageous effect of the composition according to embodiments of the invention when used for bonding a YAG:Ce phosphor to GaN. The graph presents calculated data of light transmission from the GaN to the bond as a function of incident angle for a $TiO_2$ methylpolysiloxane composition according to embodiments of the invention and a conventional silicone bond, at bond thickness of 5 μm. The calculation was made for light of 450 nm. The refractive index of the GaN was 2.422, the refractive index of the $TiO_2$ methylpolysiloxane composition was 1.854 and the refractive index of the conventional silicone bond was 1.431.

As can be seen in FIG. 6, the $TiO_2$ methylpolysiloxane composition provides a shift of the critical angle from about 36° to about 50°. Also, light transmission up to the critical angle is improved. Thus, the composition according to embodiments of the invention greatly improves light extraction from a GaN layer compared to a conventional optical bond.

EXAMPLES

Preparation of $TiO_2$ Nanoparticle Filled Metylsilicate Bond

Methyltrimethoxysilane is added to acidic aqueous dispersions of $TiO_2$ nanopaticles of anatase or rutile type, respectively. Excess solvent is removed by evaporation to increase the viscosity. The resulting adhesive fluid is dispensed on the LED to form a layer and is optionally heater further in order to remove more solvent. Next the optical component to be bonded to the LED is applied to the bonding layer and the layer is dried further and annealed to cure to a solid layer bond, at a temperature in the range of 150-200° C. for 15-60 minutes.

Preparation of $TiO_2$ Nanoparticle Filled Methylpolysiloxane Bond

A methylpolysiloxane (a silicone resin) was dissolved in a dispersion of $TiO_2$ nanoparticles in isopropanol. Excess solvent was removed by evaporation to increase the viscosity. The resulting composition exhibits reflow properties after coating. It is solid in a dry state at room temperature, and will tackify/fluidise when heated to a temperature exceeding 70° C.

After evaporation of part of the solvent the resulting adhesive fluid was dispensed on the LED to form a layer and dried to remove more solvent. The optical component to be bonded to the LED was subsequently applied to the bonding layer and the bond was heated to a temperature of at least 70° C. to achieve optical and mechanical contact. Final curing of the bond is then effected at about 200° C. for 15-60 minutes.

Alternatively, the composition may be dispensed or coated as a fluid with minimal solvent amount on either one of the components to be bonded. The bond may be dried further at mild temperatures, e.g. 50-120° C. to remove excess solvent. The second optical component is then attached to the first components. Final curing of the bond is then effected at about 200° C. for 15-60 minutes to achieve a permanent adhesive joint.

As yet another alternative, the composition may be applied as a coating on an optical component, e.g. a ceramic phosphor wafer. The coating may be realized by spincoating, bladecoating, spraycoating, screenprinting, curtain coating, casting or stencilprinting. After coating the bonding layer is dried to remove excess solvent, for example at 50-120° C. As the bonding composition is solid and non-adhesive at room temperature the optical component may be cut or diced to a desired size. Subsequently the bonding composition is heated to a temperature of at least 70° C. and the optical component applied to the LED. Final curing of the bond is then effected at about 200° C. for 15-60 minutes.

Preparation of $TiO_2$ Nanoparticle Filled Silicone Bond

A polysiloxane silicone fluid is dissolved in an apolar dispersion of $TiO_2$ nano-particles, using xylene as a solvent. A dispersing agent is used to stabilize the $TiO_2$ particles in the dispersion. The dispersion is prepared by milling $TiO_2$ nanopowder with primary particles having a size of <50 nm in xylene with the addition of the dispersing agent. The resulting dispersion is translucent. The silicone resin is a one-component silicone type. Alternatively, a two-component silicone type may be used and either both components or one of the components may be mixed with the $TiO_2$ dispersion. After dispensing, most of the solvent is removed by evaporation and the resulting $TiO_2$ filled silicone fluid is used to contact the LED with a ceramic phosphor body. In case of a two-component silicone with nano-particles added to one of the components, the second component is added prior to bonding. Finally the bond is cured at 150° C. for 1 h.

Alternatively, the $TiO_2$ dispersion may also be obtained by mixing the $TiO_2$ nanoparticulate powder with the silicone resin and a dispersing agent. Some solvent may be added to reduce the viscosity.

The composition described herein may be used for optical bonding of ceramic elements to an LED. The composition may also be used as a coating or a binder for a particulate phosphor, in particular for illumination devices of remote phosphor type. Illumination devices comprising the present composition as a bond, coat or binder may be used in flash modules, automotive front and rear light modules, signaling applications, projection applications and general illumination.

The person skilled in the art realizes that the present invention by no means is limited to the preferred embodiments described above. On the contrary, many modifications and variations are possible within the scope of the appended claims. For example, the composition of embodiments of the invention may be used for bonding any two high index optical elements together, for example two ceramic phosphor layers or bodies, e.g. a YAG:Ce phosphor and a BSSNE phosphor which in combination with a suitable LED light source may provide a warm white light. Either one of these phosphors or other optical elements may be bonded to an LED.

The invention claimed is:

1. Composition comprising a binder material and nanoparticles having an average particle diameter of 100 nm or less, the composition having a first refractive index ($n_1$) of at least 1.65 in respect of light of a first wavelength, and a second refractive index ($n_2$) in the range of 1.60-2.2 in respect of light of a second wavelength, wherein the first refractive index ($n_1$) is higher than said second refractive index ($n_2$), and wherein the first and second refractive indices can be tuned by adjusting the volume ratio of the nanoparticles to the binder material.

2. Composition according to claim 1, wherein the said first wavelength is in the range of from 350 to 500 nm and said second wavelength is in the range of from 550 to 800 nm.

3. Composition According to claim 1, wherein said first refractive index ($n_1$) is at least 1.80 and said second refractive index ($n_2$) is in the range of 1.70 to 1.90.

4. Composition according to claim 1, wherein the difference between said first refractive index ($n_1$) and said second refractive index ($n_2$) is at least 0.03, and preferably at least 0.04, said first wavelength being about 450 nm or less and said second wavelength being about 570 nm or more.

5. Composition according to claim 1, wherein said nanoparticles comprises at least one selected from the group consisting of $TiO_2$, $ZrO_2$, $Y_2O_3$, $Y_2O_3$, stabilized $ZrO_2$, $HfO_2$, $Ta_2O_5$, $Nb_2O_5$, $TeO_2$, $BaTiO_3$ and $SiC$.

6. Composition according to claim 1, wherein the volume content of nano-particles is in the range of from 15 to 75% based on the volume of the composition.

7. Composition according to claim 1, wherein the nanoparticle:binder volume ratio is from 15:85 to 99:1.

8. Composition according to claim 1, wherein said binder material comprises a silicate, an alkylsilicate and/or an alkylpolysiloxane.

9. Composition according to claim 1, which has adhesive properties.

10. Illumination device (1) comprising
a semiconductor layered structure (5) adapted to emit light of a first wavelength and comprising a transparent layer having a refractive index $n_{a1}$ in respect of a first wavelength;
a ceramic member (7) arranged adjacent said transparent layer to receive light of said first wavelength emitted by the semiconductor layered structure (5) via said transparent layer, the ceramic member (7) having a refractive index $n_{b1}$ in respect of said first wavelength; and
a bonding region (8) provided between said transparent layer of the semiconductor layered structure (5) and said ceramic member (7) and in direct contact with said transparent layer and said ceramic member (7), the bonding region (8) comprising a composition wherein said composition comprising a binder material and nanoparticles having an average particle diameter of 100 nm or less, the composition having a first refractive index (n.sub.1) of at least 1.65 in respect of light of a first wavelength, and a second refractive index (n.sub.2) in the range of 1.60-2.2 in respect of light of a second wavelength, wherein the first refractive index (n.sub.1) is higher than said second refractive index (n.sub.2), and wherein the first and second refractive indices can be tuned by adjusting the volume ratio of the nanoparticles to the binder material, wherein the first refractive index ($n_1$) of said composition matches the lower one of the refractive indices $n_{a1}$ and $n_{b1}$.

11. Illumination device according to claim 10, wherein the first refractive index $n_1$ of said composition is within from +0.01 to −0.1 of the lower one of the refractive indices $n_{a1}$ and $n_{b1}$.

12. Illumination device according to claim 10, wherein the ceramic member (7) is a wavelength converting member adapted to convert light of said first wavelength to light of a second wavelength and having a refractive index $n_{b2}$ in respect of said second wavelength, and wherein said second refractive index ($n_2$) of said composition is lower than said refractive index $n_{b2}$ of said wavelength converting member (7).

13. Illumination device comprising:
a semiconductor layered structure adapted to emit light of a first wavelength range and comprising a transparent layer having a refractive index $n_{a1}$ in respect of a first wavelength; and
a wavelength converting member arranged to receive light of said first wavelength range emitted by the semiconductor layered structure via said transparent layer, the wavelength converting member comprising: (i) a wavelength converting material adapted to convert light of said first wavelength to light of a second wavelength range and having a refractive index $n_{b1}$ in respect of said first wavelength and a refractive index $n_{b2}$ in respect of said second wavelength, and (ii) a composition as a binder for said wavelength converting material, wherein said composition comprising a binder material and nanoparticles having an average particle diameter of 100 nm or less, the composition having a first refractive index (n.sub.1) of at least 1.65 in respect of light of a first wavelength, and a second refractive index (n.sub.2) in the range of 1.60-2.2 in respect of light of a second wavelength, wherein the first refractive index (n.sub.1) is higher than said second refractive index (n.sub.2), and wherein the first and second refractive indices can be tuned by adjusting the volume ratio of the nanoparticles to the binder material, wherein the second refractive index ($n_2$) of the composition matches said refractive index $n_{b2}$ and the first refractive index ($n_1$) is higher than said refractive index $n_{b1}$.

14. Illumination device according to claim 13, wherein the second refractive index $n_2$ of said composition is within from +0.10 to −0.01 of said refractive index $n_{b2}$.

15. Method for bonding a first body to a second body via a high refractive index optical bond, comprising:
dispensing a composition on said first or second body;
contacting said first and second bodies via said composition; and
subjecting said composition to curing conditions and allowing the composition or to cure, wherein said composition comprising a binder material and nanoparticles having an average particle diameter of 100 nm or less, the composition having a first refractive index (n.sub.1) of at least 1.65 in respect of light of a first wavelength, and a second refractive index (n.sub.2) in the range of 1.60-2.2 in respect of light of a second wavelength, wherein the first refractive index (n.sub.1) is higher than said second refractive index (n.sub.2), and wherein the first and second refractive indices can be tuned by adjusting the volume ratio of the nanoparticles to the binder material.

* * * * *